Nov. 14, 1961  E. RATH ET AL  3,008,433
VEHICLE ASSEMBLIES

Filed July 21, 1958  4 Sheets-Sheet 1

INVENTORS
Erich Rath and
Friedrich Schmölter
BY Michael S. Striker
Attorney

Nov. 14, 1961 E. RATH ET AL 3,008,433
VEHICLE ASSEMBLIES
Filed July 21, 1958 4 Sheets-Sheet 3

INVENTORS
Erich Rath and
Friedrich Schmälter
BY
Michael S. Striker
Attorney

Nov. 14, 1961   E. RATH ET AL   3,008,433
VEHICLE ASSEMBLIES
Filed July 21, 1958   4 Sheets-Sheet 4
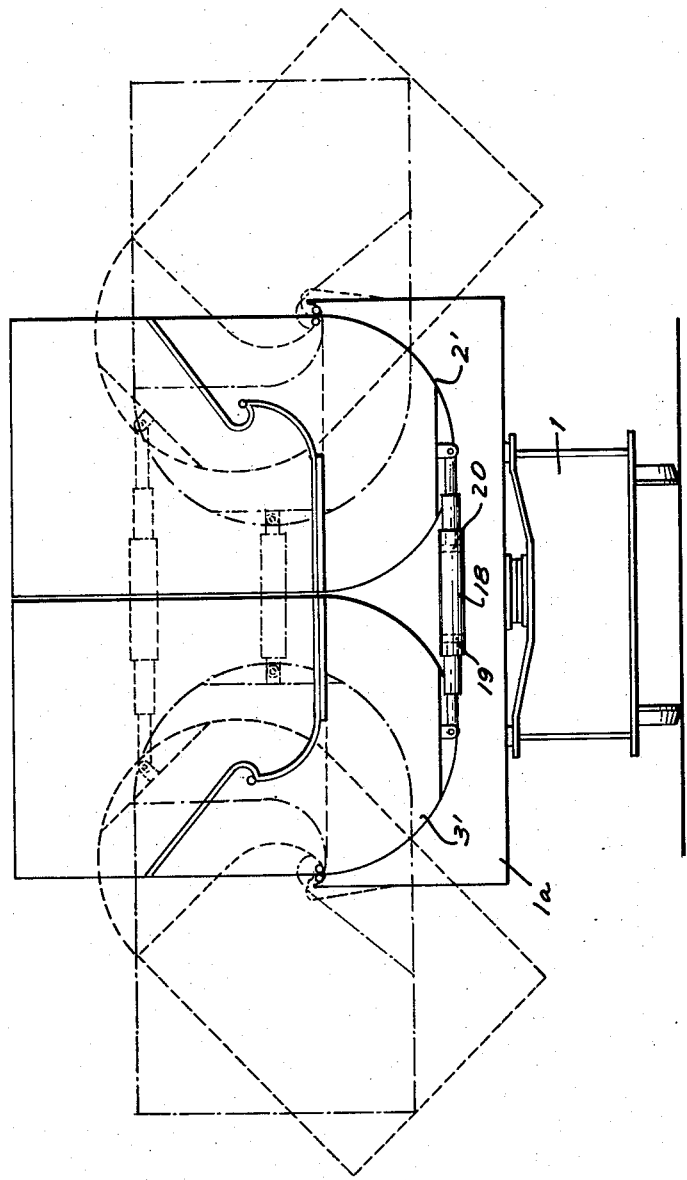
INVENTORS
Erich Rath and
Friedrich Schmälter
BY
Michael S. Striker
Attorney

United States Patent Office 3,008,433
Patented Nov. 14, 1961

3,008,433
VEHICLE ASSEMBLIES
Erich Rath, Dortmund, and Friedrich Schmälter, Dortmund-Brechten, Germany, assignors to Orenstein Koppel und Lubecker Maschinenbau Aktiengesellschaft, Dortmund, Germany
Filed July 21, 1958, Ser. No. 749,780
6 Claims. (Cl. 105—263)

The present invention relates to vehicle assemblies.

More particularly, the present invention relates to that type of vehicle assembly wherein a pair of carriages which ride on a railroad track, for example, releasably carry a load carrier connected with the carriages to form a single land-going vehicle therewith and capable, for example, of floating on a body of water when removed from the carriages so as to form a sea-going vehicle.

Such load carriers take the form of vessels which can be raised out of the water and mounted on a pair of carriages to form a land-going vehicle therewith. In this way costly delays which would result from unloading the vessel while it remains in the water are avoided. However, when a land-going vehicle of the above type reaches the destination to which the load of goods is to be delivered there are still undesirable drawbacks connected with the unloading of the goods from the load carrier connected with the carriages. Thus, at the present time complex mechanisms are required for this purpose and special installations must be set up at each destination of a vehicle of the above type in order to unload the same.

One of the objects of the present invention is to provide a land vehicle made up of a load carrier which can be itself floated on a body of water and which is connected with a pair of carriages to form the land vehicle therewith, this land vehicle being capable of unloading without requiring the use of any complex mechanisms or any special installations at each destination.

Another object of the present invention is to provide a land vehicle of the above type which includes in itself all of the necessary structure for unloading the vehicle and for placing it in a condition for receiving another load.

A further object of the present invention is to provide a land vehicle of the above type which can automatically move between load emptying and load receiving positions.

An additional object of the present invention is to provide a land vehicle of the above type which does not require the use of any source of energy to move between its load emptying and load carrying positions.

It is also an object of the present invention to provide a structure capable of accomplishing all of the above objects and made up of simple ruggedly constructed relatively inexpensive parts which operate reliably over a long period of time.

With the above objects in view the present invention includes a pair of elongated, hollow, substantially symmetrical, coextensive load carriers which are located beside each other. These carriers respectively have inner and outer side walls, and their inner side walls are located next to each other. A releasable holding means cooperates with the inner side walls of the carriers for releasably holding them together in upright load carrying positions, and the carriers are supported by a carriage means which forms a vehicle therewith. This carriage means has at least one upwardly directed surface extending transversely across the carriers and each carrier has a curved rocker means curved around an axis extending longitudinally of the carrier and cooperating with the upwardly directed surface of the carriage means for rolling movement therealong. Each load carrier provides when it is loaded a center of gravity located nearer to its outer side wall than the rocker means so that as soon as the loaded carriers are released from each other upon release of the above holding means they will automatically rock to emptying positions where open tops of the carriers are directed downwardly so that the load simply falls out of each carrier. These open tops are directed upwardly when the carriers are in their load carrying positions and are connected to each other by the above-mentioned holding means. When each load carrier is empty it provides a second center of gravity different from that which it has when it is loaded, and this second center of gravity cooperates with the rocker means to automatically rock each carrier back to its load carrying position after it has been emptied.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is an end view of another embodiment wherein a moving means moves the carriers between their load-carrying and load-emptying positions, FIG. 5 showing this structure schematically.

Figure 1:
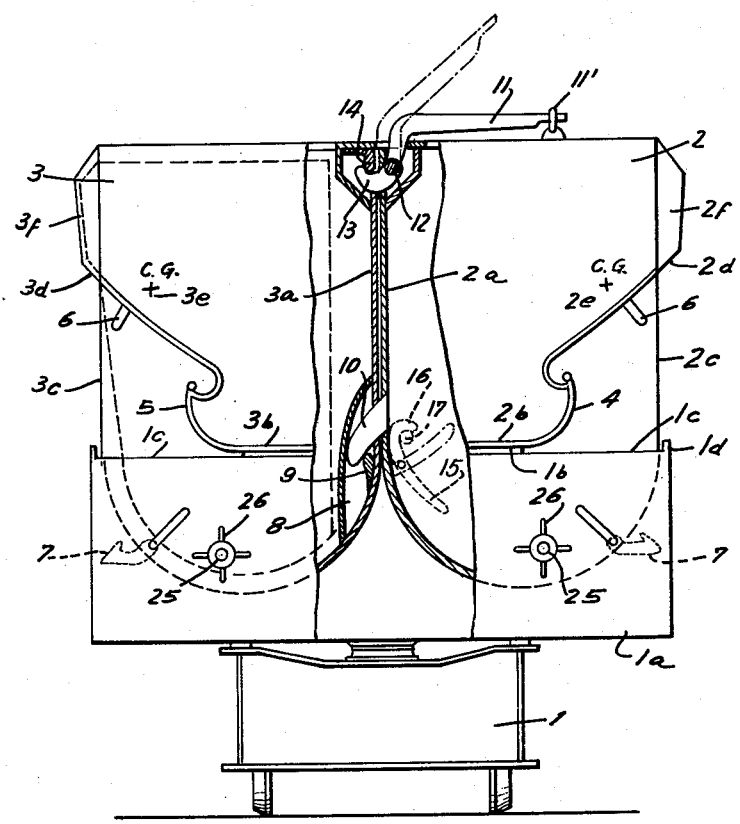
FIG. 1 is an end view of a vehicle assembly according to the present invention, FIG. 1 being partly in section to show the details of structure which releasably holds a pair of load carriers together.
Figure 4:
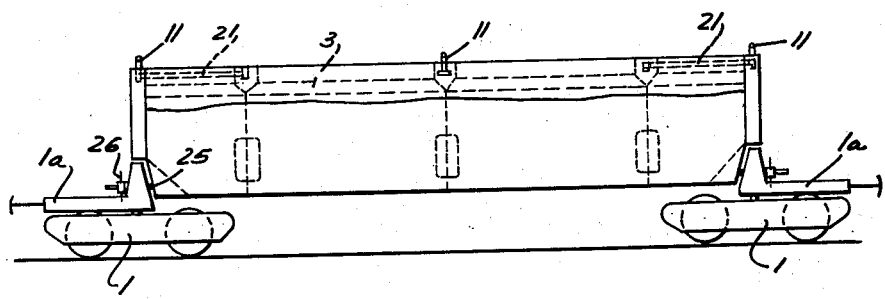
FIG. 4 is a schematic side elevational view of the entire vehicle.

Referring now to FIGS. 1 and 4, it will be seen that the vehicle assembly of the present invention includes a pair of carriages each of which has a lower assembly 1 capable of rolling on railroad tracks and an upper assembly 1*a* supported by the lower assembly 1 in a known way for turning movement about a vertical axis. These upper assemblies are connected with the load carriers 2 and 3 in a manner described below, so that with this construction the vehicle can move along straight as well as curved paths.

The load carriers 2 and 3 are each in the form of an elongated hollow container having an open top. These elongated hollow carriers are arranged substantially symmetrically and are coextensive.

A releasable holding means releasably holds the carriers 2 and 3 together in their upright load carrying position indicated in FIG. 1 where the inner side walls 2*a* and 3*a* of the carriers 2 and 3, respectively, are located next to each other. This releasable holding means includes a plurality of cutouts 8 distributed longitudinally along a lower portion of wall 3*a*. These cutouts do not pass through the wall and are in the form of recesses accessible from the exterior of the carrier 3. A plurality of rigid members 9 are respectively located in the cutouts 8 extending across the same, and these rigid members 9 are fixedly carried by the carrier 3. The releasable holding means further includes a plurality of rigid projections 10 fixed to the wall 2*a* and extending therefrom respectively downwardly into the recesses 8, and it will be noted that the projections 10 overlap the rigid members 9 while the latter are located in part between the projections 10 and the wall 2*a* so that the elements 9 and 10 cooperate to hold the walls 2*a* and 3*a* together along their lower portions.

A holding means is also provided for releasably holding the walls 2a and 3a together at their upper portions, and this structure includes a plurality of levers 11 turnably supported at the upper portion of and distributed longitudinally along the wall 2a, the latter having mounted thereon in suitable recesses pivot pins 12 which respectively turnably support the levers 11. These levers terminate respectively in hook ends 13 adapted to extend respectively into recesses of the wall 3a wherein are located downwardly directed rigid members 14 fixedly carried by the wall 3a and cooperating with the upwardly directed hook ends 13. When the levers 11 are turned from the dot-dash line position shown in FIG. 1 to the solid line position shown in FIG. 1 the hook ends 13 cooperate with members 14 to urge the projections 10 downwardly with respect to rigid members 9 and rigid members 9 upwardly with respect to projections 10 so that when levers 11 are in their solid position shown in FIG. 1 the two hollow carriers 2 and 3 are rigidly and securely locked together so as to form the equivalent of a single unitary load carrier. Hooks 11' are mounted on top surface portions of the carrier 2 and are respectively placed over the free ends of the levers 11 when they are in their solid line position shown in FIG. 1 so as to prevent levers 11 from moving away from their holding positions until the hooks 11' are turned away from the levers 11.

The portion 1a of each carriage 1, 1a has at its top end an elongated member 1b provided with an upwardly directed surface, and beyond the member 1b each carriage portion 1a has upwardly directed surface portions 1c respectively terminating in upwardly directed rigid projections 1d. Each carrier 2 and 3 is provided at each of its ends with a downwardly directed surface resting on the upper surface of member 1b when the carriers are in their upright load-carrying positions. Thus, FIG. 1 shows the downwardly directed surfaces 2b and 3b resting on the member 1b.

The levers 11 are located at both ends of the carrier 2 as well as at the three partitions of the carrier 2, as diagrammatically illustrated in FIG. 4, so that there are five levers 11 over the end walls and partitions of the member 2 which respectively cooperate with members 14 located respectively at the three partitions and end walls of the carrier 3. A pair of rods 21 fix the end levers 11 respectively to the next following levers 11 while the intermediate lever 11 is separate from the other levers. Thus, when connecting or disconnecting the carriers 2 and 3 to and from each other, respectively, the operator need only actuate the pair of end levers 11 and the central lever 11 since each end lever transmits its turning movement to the next following lever 11 through the rod 21 fixed thereto as well as to the end lever.

The carriers 2 and 3, in addition to being connected with the carriages by resting on the members 1b thereof, are fixed thereto by screw members 25 turnably supported by the carriage portions 1a and carrying hand wheels 26. Thus, by turning the hand wheel 26 the screw members 25 which can turn with respect to carriage portions 1a but cannot shift axially with respect thereto are threaded into or out of threaded bores of the carriers to fix the latter to the carriages or to disconnect the carriers from the carriages, respectively.

It will be noted from FIG. 1 that the downwardly directed surfaces 2b and 3b are located nearer to the inner side walls 2a and 3a of the carriers 2 and 3 and the outer side walls 2c and 3c thereof, respectively. These surfaces 2b and 3b respectively form extensions of a pair of rocker means 4 and 5 in the form of curved surfaces extending from the ends of surfaces 2b and 3b which are nearest to the walls 2c and 3c, respectively, and curving upwardly away from the surfaces 1c respectively around axes which extend longitudinally of the carriers 2 and 3. These rocker surfaces 4 and 5 roll along the upwardly directed surface portions 1c of each carriage during rocking of the carriers 2 and 3 between their load-carrying positions shown in FIG. 1 and their load-emptying positions shown in FIG. 2. As may be seen from FIG. 2 the ends 4' and 5' of the rocker means 4 and 5 respectively engage the projections 1d to limit the turning of the carriers 2 and 3. Also, the carriers 2 and 3 have at the ends of their outer side walls 2c and 3c inclined outer surface portions 2d and 3d which respectively engage the outer side surfaces of each carriage portion 1a when the carriers are in their emptying positions shown in FIG. 2.

The carriers 2 and 3 are so constructed that when they are loaded and unlocked from each other and the carriages they will automatically rock outwardly away from each other to their emptying positions. As is shown in FIG. 1, the carriers 2 and 3 respectively have when they are loaded centers of gravity 2e and 3e located nearer to the outer side walls 2d and 3d, respectively, than the rock means 4 and 5. This location of the centers of gravity is brought about by the construction of the carriers. Thus, in addition to the abovementioned recesses for the members 9, 14 and 11 the carriers 2 and 3 are provided at the upper part of their outer walls 2c and 3c with hollow outwardly bulging portions 2f and 3f extending longitudinally along the entire length of the carriers and receiving part of the load. These features locate the centers of gravity nearer to the outer side wall than the pair of rocker means.

When the vehicle of the invention reaches its destination and is to be unloaded the screws 25 are disconnected from the carriers and the releasable holding means is placed in its inactive position by turning the levers 11 upwardly to their dot-dash line position shown in FIG. 1. The carriers would at this moment automatically turn to their emptying positions except that they are still held in their upright load-carrying positions by levers 15 respectively carried by the upper carriage portions 1a. These manually turnable levers 15 have hook ends 16 cooperating with pins 17 fixedly carried by and located in hollow recesses of the carrier 2 so that the latter cannot rock outwardly until the hook portion 16 is turned away from the pin 17 at each end of the carrier 2, and while the latter remains in its upright position the carrier 3 cannot rock outwardly since it is held by the cooperation between projections 10 and rigid members 9. As soon as the operator turns the levers 15 to disengage the hooks 16 from the pin 17 the carriers 2 and 3 rock outwardly from the position in FIG. 1 to that of FIG. 2 and the loads drop by gravity from the open tops of the carriers which are now directed downwardly. The carriers 2 and 3 fixedly carry at each of their ends eyes 6, and the carriage portions 1a carry manual turnable hook members 7 which the operators engage with the eyes 6 (FIG. 2) for a purpose pointed out below.

While the carriers 2 and 3 have the centers of gravity 2e and 3e shown in FIG. 1 when they are loaded, these carriers have centers of gravity 2g and 3g when they are empty, the latter centers of gravity being provided by giving the carriers relatively heavy bottom walls. As a result, when the carriers are empty and in a position of FIG. 2 they will automatically turn back to the position of FIG. 1 because the centers of gravity 2g and 3g are nearer to each other than the pair of rocker means 4 and 5 at the ends of the carriers. The hooks 7 cooperate wtih the eyes 6 to prevent the carriers from rocking back to their upright load-carrying positions when they are empty, so that in this way complete emptying of the carriers is guaranteed. When the carriers are fully empty the operators turn the hooks 7 out of engagement with the eyes 6 and the carriers automatically rock back to their load-carrying positions. Then the operators again connect screws 25 to the carriers, return levers 11 to their active solid line position shown in FIG. 1, and place the hooks 16 in engagement with the pins 17. It should be noted that the hooks 7 which cooeprate with the eyes 6 of the carrier 3 are first moved away from the eyes 6 so that the carrier 3 turns back to its upright load-carrying position before the carrier 2 so that the rigid members 9 will be in position before the projections 10 enter the recesses 8 to ride over the rigid members 9 to the position indicated in FIG. 1.

As is diagrammatically shown in FIG. 5, instead of relying upon the different centers of gravity to roll the carriers, these carriers 2' and 3' shown in FIG. 5 may have simple constructions which include smooth straight side walls and simple curved bottom walls to which a pair of pistons 19 and 20 are connected pivotally as indicated in FIG. 5. These pistons slide fluid-tightly in a common cylinder 18 which communicates with an unillustrated source of fluid under pressure through a conduit and suitable valves which are operated by the operator so as to first draw the pistons 19 and 20 toward each other and then move them away from each other to rock the carriers 2' and 3' from their load-carrying to their load-emptying positions, and after the carriers are empty the pistons 19 and 20 are again drawn toward and subsequently moved away from each other to return the carriers to their upright load-carrying positions. With the arrangement of FIG. 5 the loaded carriers will have higher centers of gravity than the empty carriers so that when rocking from their load-carrying to their load-emptying positions the loaded carriers will automatically continue the movement of the hydraulic means 18–20 upwardly beyond the central elevation thereof indicated in FIG. 5, while when the carriers are empty they will have lower centers of gravity which will guarantee the continued downward movement of the hydraulic means 18–20 beyond the central elevation thereof indicated in FIG. 5 during the return of the carriers to their upright load-carrying positions.

The hydraulic arrangement of FIG. 5 may be used where a source of hydraulic fluid under pressure is readily available. However, the embodiment of FIGS. 1–4 is greatly preferred and is in fact far superior to the embodiment of FIG. 5 since the embodiments of FIGS. 1–4 requires absolutely no source of outside energy for moving the carriers between their load-carrying and load-emptying positions, these carriers rocking automatically between these positions in the manner described above.

Figure 2:
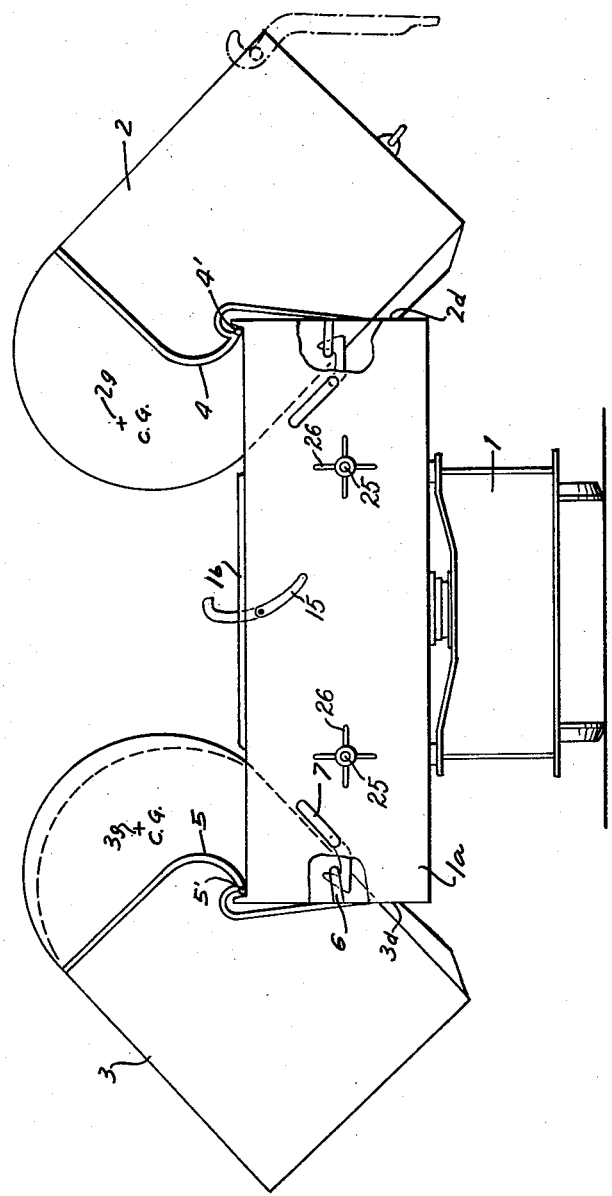
FIG. 2 is also an end elevational view of the vehicle assembly shown in FIG. 1, but in FIG. 2 the structure is shown in its load-emptying position while in FIG. 1 the structure is shown in its load-carrying position.
Figure 3:
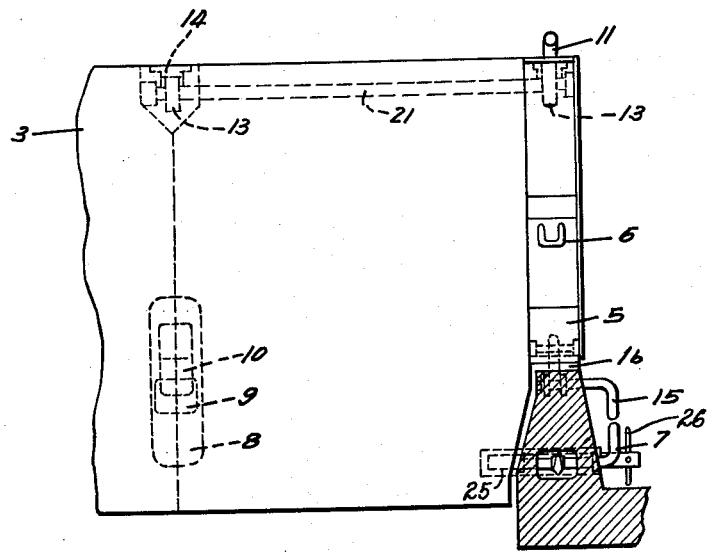
FIG. 3 is a fragmentary side elevational view illustrating the cooperation between an end of a load carrier with a carriage.

It is to be understood that the structure shown in FIGS. 1–3 is duplicated at both ends of the vehicle assembly. The above-described operations on the various levers and hooks may be performed at both ends of the vehicle simultaneously by a pair of operators at both of the carriages 1, 1a or a single operator may operate the levers and hooks at one carriage and then go to the other carriage to operate the levers and hooks at the other end of the vehicle. Also, the operator can easily walk along the top of the carriers to release and engage the central lever 11.

Of course, it is also possible to provide an electrical structure which automatically operates all of the levers and hooks so that the structure is fully automatic.

It will be understood that each of the elements described above, or two or more together, may also find a useful application in other types of vehicle assemblies differing from the types described above.

While the invention has been illustrated and described as embodied in load-carrying vehicle assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A vehicle assembly comprising, in combination, a pair of elongated, hollow, coextensive, substantially symmetrical, floatable carrier means for transportation of goods on land and water, said carrier means each having an outer side wall, an inner side wall, end walls and a bottom wall fixedly connecting said side and end walls to form an integral container open at its top, said pair of carrier means being located besides each other with said inner side walls thereof located next to each other, and each carrier means providing when it is loaded with goods a center of gravity located a given distance from said inner side wall thereof; releasable holding means attached only to said carrier means for releasably holding said carrier means in fixed position together in side by side relation; carriage means removably supporting said pair of carrier means and forming a single vehicle therewith, said carrier means having at least one upwardly directed surface extending transversely across said pair of carrier means; and curved rocker means curved around an axis extending longitudinally of each carrier means and carried by each carrier means nearer to the inner side wall thereof than said given distance, each rocker means cooperating with said surface of said carriage means for rolling movement therealong, whereby when said releasable holding means is actuated to release said pair of carrier means from each other they will automatically rock outwardly away from each other while said rocker means roll on said surface until said pair of carrier means are in a discharge position where their open tops are directed downwardly for emptying said pair of carrier means, said pair of carrier means in said discharge position thereof having, respectively, upwardly directed bottom wall portions located nearer to each other than said pair of rocker means and respectively providing in said discharge position when they are empty centers of gravity located respectively between said pair of rocker means, so that when the pair of carrier means are empty they automatically roll back to their starting position where their open tops are directed upwardly and the inner side walls are again located next to each other so that said releasable holding means can again hold the pair of carrier means fixed to each other in side by side relation.

2. A vehicle assembly as recited in claim 1 and wherein said carriage means carries an additional releasable holding means which cooperates with the pair of carrier means for releasably holding them in said position where their tops are directed downwardly so as to prevent the pair of carrier means from rolling back to their starting position until said additional releasable holding means is actuated to release the pair of carrier means after they are empty.

3. A vehicle assembly comprising, in combination, a pair of elongated, hollow, coextensive, substantially symmetrical, floatable carrier means for transportation of goods on land and water, said carrier means each having an outer side wall, an inner side wall, end walls and a bottom wall fixedly connecting said side and end walls to form an integral container open at its top, said pair of carrier means being located besides each other with said inner side walls thereof located next to each other, and each carrier means providing when it is loaded with goods a center of gravity located a given distance from said inner side wall thereof, each carrier means having at both of its ends a downwardly directed surface portion extending transversely of the carrier means outwardly from the inner side wall thereof, and each carrier means having at each of its ends a curved rocker surface forming an extension of each downwardly directed surface portion and curving upwardly from the end of each downwardly directed surface portion which is nearest to said outer side wall of each carrier means, said curved rocker surfaces being respectively spaced from said inner side walls a distance smaller than said given distance; releasable holding means attached only to said carrier means for releasably holding said carrier means in fixed position together in side by side relation; a pair of carriages removably carrying said pair of carrier means and forming a single vehicle therewith, said pair of carriages being respectively located beneath the ends of the pair of carrier means and each carriage having an elongated upwardly directed surface extending transversely across said pair of carrier means at each end thereof, said downwardly directed surface portions of said carrier means resting on said upwardly directed surfaces of said pair of carriages, whereby when said releasable holding means is actuated to release said pair of carrier means from each other they will automatically rock outwardly away from each other while said curved rocker surfaces roll on said upwardly directed surface until said pair of carrier means are in a discharge position where their open tops are directed downwardly for emptying said pair of carrier means, said pair of carrier means in said discharge position thereof having, respectively, upwardly directed bottom wall portions located nearer to each other than said pair of curved rocker surfaces and respectively providing in said discharge position when they are empty centers of gravity located respectively between said pair of curved rocker surfaces, so that when the pair of carrier means are empty they automatically roll back to their starting position where their open tops are directed upwardly and the inner side walls are again located next to each other so that said releasable holding means can again hold the pair of carrier means fixed to each other in side by side relation.

4. A vehicle assembly as recited in claim 3 and wherein said pair of carrier means are provided with eyes and said pair of carriages are provided with manually turnable hooks which respectively engage said eyes to hold said pair of carrier means in said emptying discharge positions thereof so as to prevent the pair of carrier means from turning back to their load-carrying positions until said hooks are manually released from said eyes.

5. A vehicle assembly comprising, in combination, a pair of elongated, hollow, substantially symmetrical, co-extensive, floatable carriers adapted for transportation of goods on land and water, said carriers being located beside each other and respectively having side walls located next to and directed toward each other, one of said side walls being formed at a lower portion thereof with a plurality of cutouts distributed longitudinally along said one side wall; a plurality of projections fixed to the other of said side walls at a lower portion thereof, also distributed longitudinally therealong, and extending therefrom respectively downwardly into said cutouts; a plurality of rigid members carried by said one side wall respectively in and extending across said cutouts thereof, said projections respectively overlapping said rigid members and said rigid members being located at least in part between said projections, respectively, and said other side wall so that said projections and rigid members cooperate to connect said side walls to each other at said lower portions thereof; a plurality of releasable holding means carried by said other side wall at an upper portion thereof, distributed longitudinally along said other side wall, and cooperating with an upper portion of said one side wall for releasably holding said side walls together at said upper portions thereof; and carriage means removably supporting said carriers and forming a vehicle therewith.

6. A vehicle assembly as recited in claim 5 and wherein said plurality of releasable holding means are in the form of turnable hook members and wherein said upper portion of said one side wall is provided with a plurality of downwardly directed projections respectively engaged by said hook members for releasably holding said side walls together at said upper portions thereof.

References Cited in the file of this patent

UNITED STATES PATENTS

| | | |
|---|---|---|
| 644,490 | Argo | Feb. 27, 1900 |
| 684,127 | Swindall | Oct. 8, 1901 |
| 780,446 | Richardson | Jan. 17, 1905 |
| 1,274,833 | Worthman | Aug. 6, 1918 |
| 1,725,994 | Minetty | Aug. 27, 1929 |
| 2,513,552 | Dove | July 4, 1950 |

FOREIGN PATENTS

| | | |
|---|---|---|
| 502,409 | Belgium | Apr. 30, 1951 |
| 366,884 | Germany | Jan. 12, 1923 |